United States Patent
Alexander et al.

(10) Patent No.: US 6,956,816 B1
(45) Date of Patent: Oct. 18, 2005

(54) FAULT TOLERANT AUTOMATIC PROTECTION SWITCHING FOR DISTRIBUTED ROUTERS

(75) Inventors: Cedell A. Alexander, Durham, NC (US); Donald B. Grosser, Apex, NC (US)

(73) Assignee: Extreme Networks, Santa Clara, CA (US)

( * ) Notice: Subject to any disclaimer, the term of this patent is extended or adjusted under 35 U.S.C. 154(b) by 816 days.

(21) Appl. No.: 09/784,841

(22) Filed: Feb. 15, 2001

(51) Int. Cl.[7] .............................. H04J 1/16; H04J 3/14
(52) U.S. Cl. ...................... 370/222; 370/219; 370/220
(58) Field of Search ................................ 370/216, 276, 370/352, 533, 535, 539, 386, 395.51, 541, 370/401, 217, 218, 219, 220, 221, 222, 223, 370/224, 228, 227; 714/100, 1, 2

(56) References Cited

U.S. PATENT DOCUMENTS 5,835,696 A * 11/1998 Hess ............................ 714/10
6,530,032 B1 * 3/2003 Shew et al. ..................... 714/4
6,657,952 B1 * 12/2003 Shiragaki et al. ........... 370/223

OTHER PUBLICATIONS

Internet Engineering Task Force (IETF) RFC-1661, "The Point-to-Point protocol (PPP)".*

* cited by examiner

Primary Examiner—Ajit Patel

(74) Attorney, Agent, or Firm—Blakely Sokoloff Taylor & Zafman, LLP.

(57) ABSTRACT

A working router is coupled to a SONET add-drop multiplexor (ADM) through a working line and a protection router is coupled to the ADM through a protection line. The routers are coupled to each other by a separate side-band connection and comprise a virtual router from the perspective of the neighboring router, which communicates with the virtual router over the SONET network using the Point-to-Point Protocol (PPP). The protection router transmits a heartbeat message to the working router over the side-band connection. If the protection router does not receive a response thereto, it initiates a line switch within the add-drop multiplexor. Once the line switch is complete, the protection router exchanges datagrams with the neighboring router, via the ADM and SONET ring to which the ADM is coupled. The protection router establishes a PPP connection between itself and the neighboring router device coupled to the SONET ring, utilizing the Link Control Protocol (LCP). The protection router includes a predetermined identifier value that identifies the originator of the request, in the LCP Identifier field of LCP request datagrams. The neighboring router includes the Identifier value received in a request datagram in the corresponding response datagram transmitted over the SONET ring to the ADM. Because datagrams received by the ADM from the SONET link are transmitted over both the working and the protect lines, the working router receives the same response as the protection router. Thus, by examining the identifier field, and recognizing the identifier value as that assigned to the protection router, the working router determines that the line switch to the protection router has occurred.

21 Claims, 6 Drawing Sheets

| Interframe Fill 0111 1110 | Address 1 or 2 bytes | Control 1 or 2 bytes | Data 0 to X bytes | Checksum (FCS) 1 or 2 bytes | Interframe Fill 0111 1110 |
|---|---|---|---|---|---|

Basic HDLC frame format

| Flag 0111 1110 | Address 1111 1111 | Control 0000 0011 | Protocol ID 1 or 2 bytes | Information Variable/Pad | FCS 2 or 4 bytes | Flag 0111 1110 |
|---|---|---|---|---|---|---|

Basic PPP frame format

FIG. 5 (Prior Art)

| bit # | 1 | 4 | 5 | 8 |
|---|---|---|---|---|
| K1 | REQUEST | | CHANNEL # | |

| bit # | 1 | 4 | 5 | 6 | 8 |
|---|---|---|---|---|---|
| K2 | CHANNEL # | | ARCH | MODE / INDICATION | |

FIG. 6(a) (Prior Art)

REQUEST

| 0000 | No Request |
|---|---|
| 0001 | Do Not Revert (nonrevertive only) |
| 0010 | Reverse Request (bidirectional only) |
| 0100 | Exercise |
| 0110 | Wait-To-Restore (revertive only) |
| 1000 | Manual Switch |
| 1010 | Signal Degrade |
| 1100 | Signal Fail |
| 1100 | Forced Switch |
| 1111 | Lockout of Protection |

FIG 6(b) (Prior Art)

MODE / INDICATION

| 100 | Provisioned for Unidirectional Switching Mode |
|---|---|
| 101 | Provisioned for Bidirectional Switching Mode |
| 110 | Line Remote Defect Indication (RDI-L) |
| 111 | Line Alarm Indication Signal (AIS-L) |

FIG. 6(c) (Prior Art)

FAULT TOLERANT AUTOMATIC PROTECTION SWITCHING FOR DISTRIBUTED ROUTERS

FIELD OF THE INVENTION

The invention relates generally to data networking. More specifically, the invention relates to fault tolerant switching within a data network.

BACKGROUND OF THE INVENTION

As the Internet continues to grow exponentially, the bandwidth requirements of the associated networks comprising the Internet similarly continue to grow. The transmission of large quantities of multimedia data, for example, including both audio and video data, has contributed to what has become a seemingly universal demand for increased network bandwidth. In addition to requiring large amounts of bandwidth, real-time multimedia data also tends to be isochronous, in that it is to be received at a destination device at the same rate with which it was transmitted from the sending device. If such real-time multimedia data is delayed during transmission between the source device and the destination device, the resulting image and/or sound quality of the multimedia "stream" may be adversely affected.

When a network segment located between a source device and a destination device becomes unavailable, data en route from the source device to the destination device has to be rerouted so as to bypass the unavailable network segment. Such rerouting of data due to unexpected network outages may add significant delay to the total data transmission time. One cause for unexpected network outages and associated data transmission delays may be attributed to excavation accidents where one or more network segments are severed. Conventional copper networks, for example, tend to not be very resilient and are quite susceptible to such accidental severing or "backhoe fade."

New technologies are continually being introduced to address the various demands for increased network bandwidth and improved resiliency. Optical networking is one such technology. In general, optical networks utilize optical glass wires or "fibers" to transmit data in the form of light pulses along the fiber. Among other features, optical fiber is capable of carrying much more information than conventional copper wire and is generally not subject to electromagnetic interference as is copper wiring.

Synchronous Optical Network (hereinafter "SONET") is a technology that combines the high-bandwidth network capacity of optical fiber with the resiliency of automatic protection switching. The SONET optical interface is specified in the American National Standard for Telecommunications—Synchronous optical network (SONET)—Basic description including multiplex structures, rates, and formats, ANSI T1.105-1995; and SONET Automatic Protection Switching (hereinafter "APS") is specified in the American National Standard for Telecommunications—Synchronous optical network (SONET)—Automatic Protection Switching, ANSI T1.105.01-1998. Synchronous Digital Hierarchy (hereinafter "SDH") is the international equivalent of SONET and is standardized by the International Telecommunications Union (ITU). Although SDH may not be specifically referred to herein, the concepts described with respect to SONET nonetheless apply equally to SDH.

The APS protocol describes an architecture in which data signals travelling across one signal path may be automatically switched to another signal path due to a variety of circumstances such as signal degradation or line failure. For example, assume a router is connected to a signal multiplexor by both a working line (i.e. primary circuit) and a protection line (i.e. backup circuit). If the working line were to fail, or signal quality on the working line were to degrade, APS would perform an automatic switchover so that signals would travel to and from the router via the protection line rather than the working line, thereby maintaining communication between the multiplexor and the router.

Several different automatic protection switching schemes are addressed by the APS specification. One such switching scheme is protection switching for linear 1+1 topologies. Linear APS is used to protect tributary SONET lines which connect routers to Add-Drop multiplexors (hereinafter "ADM"), whereas ring APS architectures protect the lines between equipment comprising the SONET ring itself. FIG. 1 illustrates an exemplary linear APS 1+1 architecture according to the prior art. As shown in FIG. 1, each router is coupled to the ADM and SONET ring by both a working line and a protection line. Accordingly, if either working line were to fail, for example, the corresponding protection line could be used in order to maintain communication with the SONET ring.

Each working line and protection line pair may be coupled to an associated router through either a single SONET interface module or a pair of SONET interface modules. In FIG. 1, for example, each working/protection line pair is coupled to an associated router through a pair of interface modules, however, a single module implementation may also be utilized. While the single module implementation protects against line failures, the two module implementation protects against both line and interface module failures. Neither implementation, however, protects against interruptions in network communication due to an entire router failure.

SUMMARY OF THE INVENTION

A fault tolerant switching architecture comprises a working router coupled to a SONET add-drop multiplexor (ADM) through a working line and a protection router coupled to the ADM through a redundant, protection line. Additionally, the working and protection routers are coupled to each other by way of a separate link, referred to as a side-band connection. The working router and protection router comprise a virtual router from the perspective of the neighboring router, which communicates with the virtual router over the SONET network using the Point-to-Point Protocol (PPP). The goal of the architecture is to provide fault tolerance in the event of either a line or router failure. According to one embodiment of the invention, the protection router transmits a heartbeat message to the working router over the side-band connection. If the protection router does not receive a response to the transmitted heartbeat message, the protection router initiates a line switch within the add-drop multiplexor. Once the line switch is complete, the protection router exchanges datagrams with the neighboring router, via the ADM and SONET ring to which the ADM is coupled. The protection router, in so doing, establishes a PPP connection between the protection router and the neighboring router device that is also coupled to the SONET ring. The PPP connection between the protection router and the neighboring router is established with the Link Control Protocol (LCP). The protection router includes a predetermined identifier value that identifies the originator of the request, in the LCP Identifier field of LCP request datagrams. According to the LCP specification, the neighboring router includes the LCP Identifier value received in a request datagram in the corresponding response datagram. The response datagram is transmitted over the SONET ring to the ADM. Because datagrams received by the ADM from the SONET link are transmitted over both the working and the protect lines, the working router will receive from the ADM the same response that was sent to the protection router. Thus, by examining the identifier field, and recognizing the identifier value as that assigned to the protection router, the working router is able to determine that the line switch to the protection router has occurred. This knowledge enables proper network operation in the case where the protection router loses contact with the working router due to a faulty side-band connection rather than a malfunctioning working router.

BRIEF DESCRIPTION OF THE DRAWINGS

The invention is illustrated by way of example, and not by way of limitation in the figures of the accompanying drawings in which like reference numerals refer to similar elements.

FIG. 5 illustrates formats for a basic HDLC frame and a basic PPP frame.

FIGS. 6(a)–(c) illustrate the format and possible contents of the K1 and K2 bytes.

DETAILED DESCRIPTION

Figure 1:
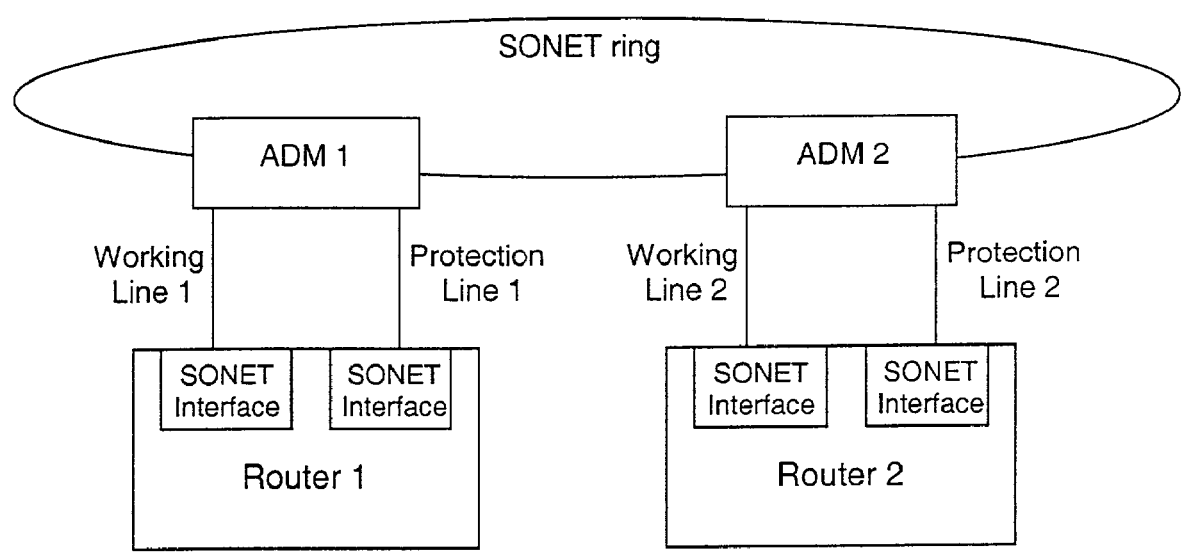
FIG. 1 is a block diagram illustrating one example of a linear 1+1 APS architecture according to the prior art.

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

A fault tolerant switching architecture is described herein. More specifically, a novel two-router linear 1+1 APS architecture including both a working and a protection router is described herein. The working router is coupled to an add-drop multiplexor (ADM) through a working line, and the protection router is coupled to the ADM through a protection line. Additionally, the working and protection routers are coupled to each other via a side-band network connection. According to one embodiment of the invention, the protection router transmits a heartbeat message to the working router. If the protection router does not receive a response to the transmitted heartbeat message, the protection router initiates a line switch within the add-drop multiplexor to which both are attached. Once the line switch is complete, the protection router transmits a signal to the ADM to establish a point-to-point link between the protection router and a neighboring router also coupled to the SONET ring. In one embodiment, the signal is transmitted to the ADM the via protection line, over the SONET ring to the neighboring router, and back to the working router via the line between the ADM and the working router. The signal is an identifier value, which is included in request datagrams and the corresponding response datagrams. The identifier value is used to indicate to the working router that the line switch to the protection router has occurred. Thus, if the protection router loses contact with the working router (i.e., it does not receive a response to the heartbeat message) due to a faulty side-band connection rather than due to a malfunctioning working router, the working router is able to detect that the line switch to the protection router has occurred and can subsequently disable its SONET interface.

The APS standard specifies at least two linear APS 1+1 switching modes: unidirectional protection switching and bidirectional protection switching. In unidirectional protection switching, both head end (i.e. the node executing a bridge) and tail end (i.e. the node that initiates an APS request) monitor the quality of the optical signals on the working line and the protection line such that receiving equipment on either end can independently select the signal with the best quality. In bidirectional protection switching, the switching from one line to another is coordinated. That is, both head and tail ends are synchronized such that both ends select the same signal line. Synchronization is achieved via APS protocols that are carried in the K1 and K2 bytes of the SONET line overhead. The K1 and K2 bytes are typically transmitted on the protection line, but may also be transmitted on the working line.

Figure 2:
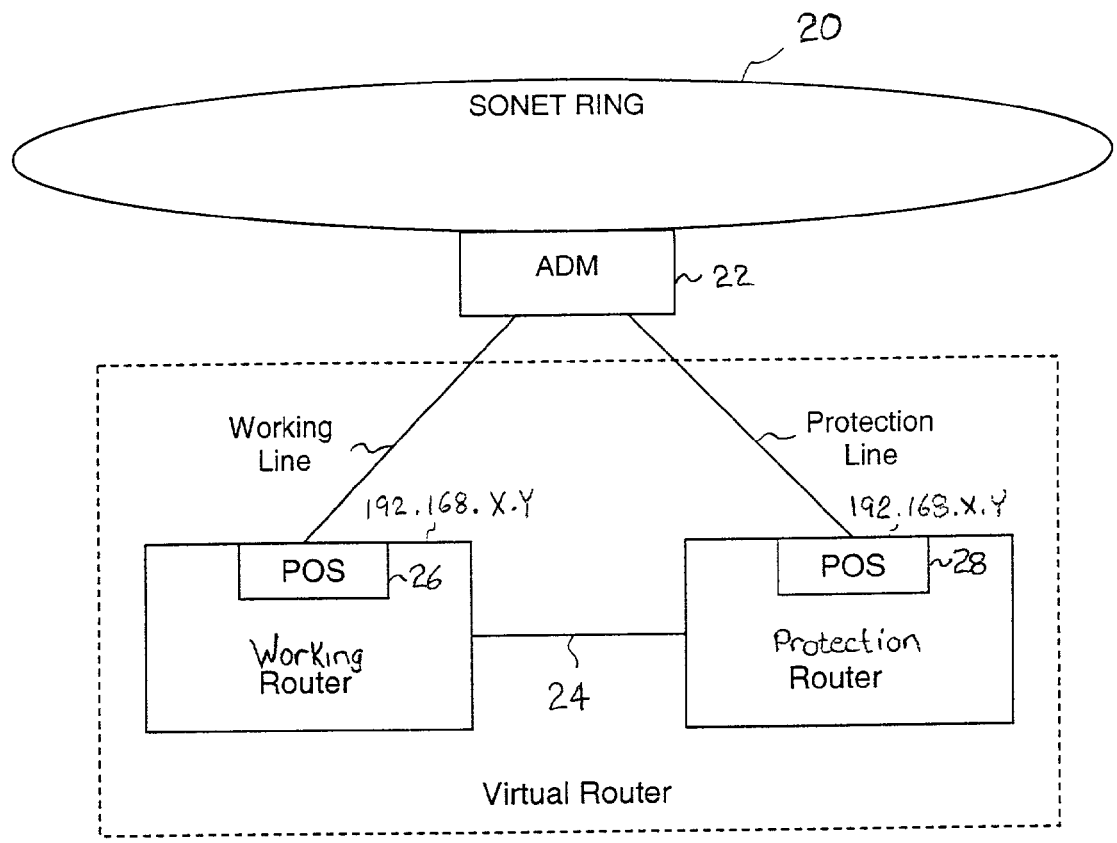
FIG. 2 is a block diagram illustrating a prior art, two-router, linear 1+1 APS architecture utilized in one embodiment of the invention.

Bidirectional protection switching is advantageous for data communication applications where the working line and the protection line may be terminated in different routers. FIG. 2 is a block diagram illustrating a two-router, linear 1+1 APS architecture according to one embodiment of the invention. Referring to FIG. 2, a working router and a protection router are shown coupled to SONET ring 20 through ADM 22. In addition to being coupled to ADM 22, the working and protection routers are further coupled to one another by side-band connection 24. Side-band connection 24 represents an out-of-band communications channel that is used to synchronize the working and protection routers' use of the SONET interface. For example, if the working router detects a degradation in signal quality on the working line, it can send a message to the protection router over side-band connection 24. In response, the protection router can then initiate a switch to the protection line so as to maintain communication with SONET ring 20. According to one embodiment of the invention, side-band connection 24 is also used to deliver heartbeat messages that enable the protection router to take over if the working router should fail. In one embodiment, side-band connection 24 is an Ethernet connection that operates out-of-band with respect to SONET ring 20. In other embodiments, however, side-band connection 24 may represent any wired or wireless transmission medium known in the art to transmit heartbeat messages between protection and working routers.

Figure 3:
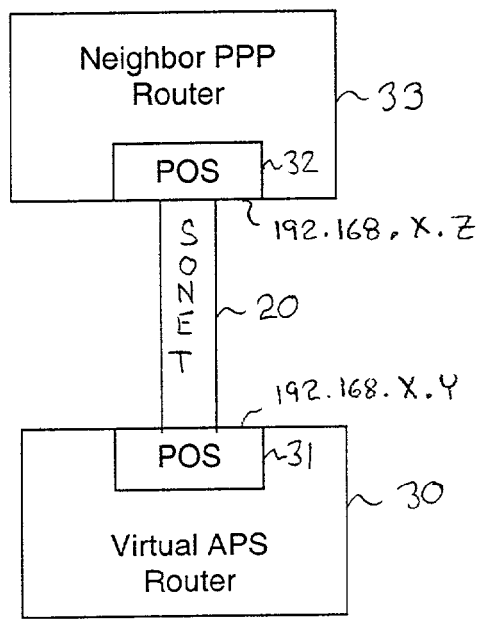
FIG. 3 is a block diagram illustrating a prior art virtual router representation.

If both the working router and the protection router are configured with the same network address (e.g., IP address), the two routers can appear as a single "virtual" router to other devices on SONET ring 20. FIG. 3 is a block diagram illustrating a virtual router representation of the working and protection routers of FIG. 2. Virtual router 30 is coupled to neighbor router 33 via Packet over SONET interface module (PoS) 31, SONET ring 20, and PoS 32. PoS 31, as an abstraction of PoS 26 and 28, represents or utilizes the same IP address assigned for PoS 26 and PoS 28 of FIG. 2, whereas PoS 32 is configured with a unique IP address. Accordingly, virtual router 30 appears to neighboring router 33 as a single routing device rather than two cooperating routers.

Each PoS represents a network interface that enables a synchronous payload envelope (SPE) to be structured in rows while providing for the transport of any open systems interconnection reference model (OSI-RM) layer 3 packet structure given appropriate framing. The Internet Point-to-Point Protocol (PPP) and OSI-RM High-level Data Link Control Protocol (HDLC) are two data framing protocols used in conjunction with SONET. The PPP definition can be found in the Internet Engineering Task Force's request for comments RFC1661, whereas "PPP in HDLC-like framing" and "PPP over SONET/SDH" are defined in RFC1662 and RFC2615 respectively.

Figure 4:
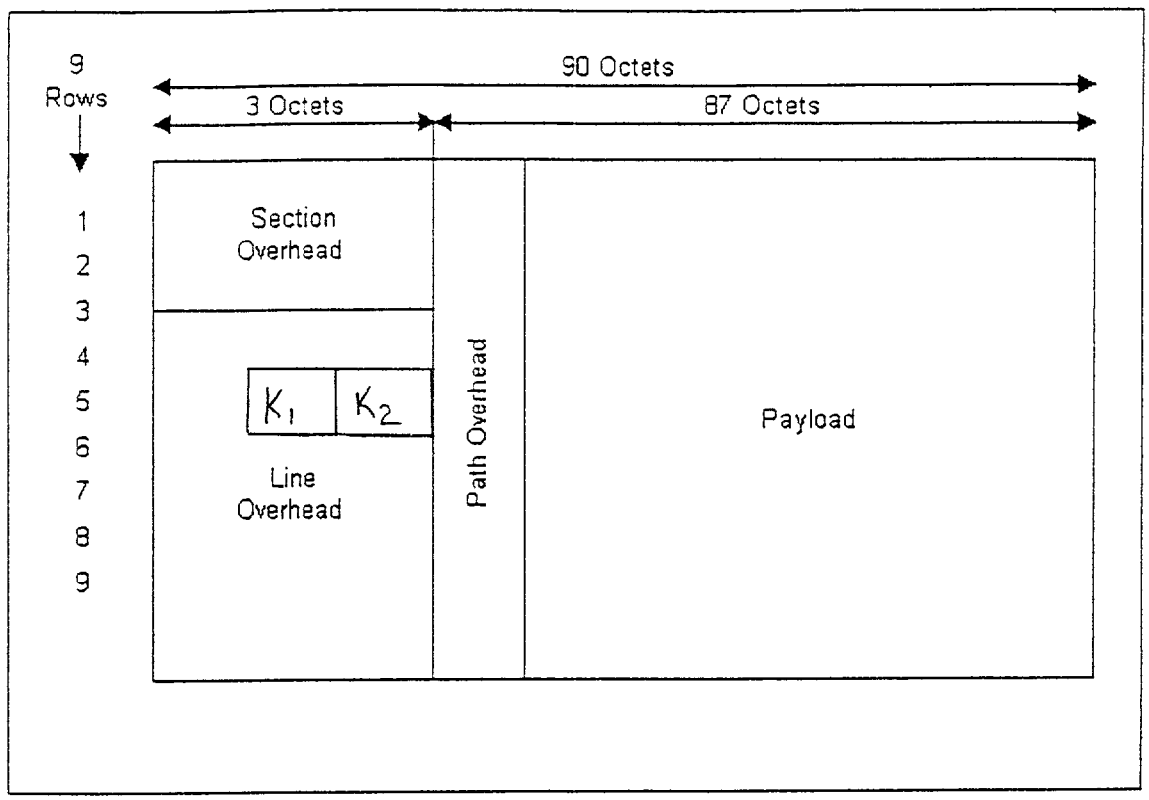
FIG. 4 illustrates a SONET frame structure including payload and overhead sections.

FIG. 4 illustrates a SONET frame structure including payload and overhead sections. Each SONET frame is logically organized as a two-dimensional array of bytes with the size of the frame dependent upon the channel rate. The basic SONET channel consists of frames that contain 810 bytes organized in 9 rows by 90 columns. The first 3 columns are reserved for SONET overhead, whereas the last 87 columns are dedicated to the SPE. A SONET ring provides point-to-point connections between routers within the ring. IP packets therefore utilize a point-to-point protocol, such as PPP or HDLC, to map to a point-to-point link. FIG. 5 illustrates formats for a basic HDLC frame and a basic PPP frame with the HDLC framing. Both the HDLC and the PPP frame structures are defined to have minimum and maximum length constraints. Within the HDLC and the PPP frame structures are packets, each of which may vary in size so long as they do not exceed a defined maximum length. In one embodiment of the invention PPP frame structures are used to transport IP packets.

Due to the flexibility of SONET and APS, a variety of line-switching scenarios are possible given the network configuration depicted in FIG. 2. For the purposes of this disclosure two of such possible scenarios will be discussed, each of which assumes a bidirectional switching mode implementation. Additionally, each scenario assumes the working router to be active. In the first line switching scenario to be discussed, the working router detects a signal fail or degrade condition on the working line and initiates a line switch to the protection line. In the second line switching scenario to be discussed, the protection router loses contact with the working router and a line switch to the protection line is initiated by the protection router.

Switching Scenario 1

In the first switching scenario, it is assumed that the working line is active, and that the working router initiates a switch to the protection line upon detecting a signal fail/degrade condition on the working line. The working router initiates the line switch by transmitting a message to the protection router over side-band connection 24 (of FIG. 2). In one embodiment, communications between the working router and the protection router are conducted via the user datagram protocol (UDP) known in the art. Upon receiving the message transmitted by the working router, the protection router invokes the APS protocol to request that ADM 22 switch to the protection line.

As mentioned previously, the APS protocol is carried in the K1 and K2 bytes of the SONET overhead (shown in FIG. 4). FIGS. 6(a)–(c) illustrate the format and possible contents of the K1 and K2 bytes. Referring to FIG. 6(a), the first four bits of the K1 byte represent the switch request bits. These bits provide for the exchange of up to sixteen request messages. FIG. 6(b) illustrates ten of the sixteen possible request messages that may be represented by K1 (bits 1:4). For example, during normal operation, the K1 request bits are set to "0000" as no request is being made. A signal fail indication, however, would result in the K1 request bits being set to "1100." The K1 byte further contains bits five through eight which identify the number of the channel (i.e., working/protection line) carrying the request. For example, in this scenario it is assumed that the working router issues the request, and bits 5–8 of the K1 byte would therefore be assigned "0001" to reflect this. If the protection router issued the request, bits 5–8 of the K1 byte would be assigned "0000."

The first four bits of the K2 byte indicate the channel number that is bridged onto the protection line. If channel "0" is received on bits 5–8 of the K1 byte, the first four bits of the K2 byte are set to "0000." Bit five of the K2 byte indicates the APS architecture implementation, in which a "0" is provisioned for 1+1 architecture. The remaining three bits of the K2 byte indicate various modes or status messages available as shown in FIG. 4(c).

TABLE 1

| | Protect Router → ADM | | ADM → Protect Router | |
| --- | --- | --- | --- | --- |
| | K1 Byte | K2 Byte | K1 Byte | K2 Byte |
| (a) | 0000 0000 | 0000 0 101 | 0000 0000 | 0000 0 101 |
| (b) | 1010 0001 | 0000 0 101 | 0000 0000 | 0000 0 101 |
| (c) | 1010 0001 | 0000 0 101 | 0010 0001 | 0001 0 101 |
| (d) | 1010 0001 | 0001 0 101 | 0010 0001 | 0001 0 101 |
| (e) | 1010 0001 | 0001 0 101 | 0010 0001 | 0001 0 101 |

Table 1 (above) illustrates one example of an APS protocol exchange between the protection router and ADM 22 (shown in FIG. 2), for switching from the working line to the protection line. In row (a), the first four bits of K1 indicate that no request is being made, and the last four bits indicate that the channel number is set to the protection line by default. Similarly, the K2 byte is in a steady state, with the last three bits indicating that a bidirectional switching mode is active. In row (b), the protection router receives a signal degrade message from the working router over side-band connection 24, and sends a signal degrade request for channel 1 (i.e., working line) to ADM 22. In row (c), ADM 22 acknowledges the signal degrade request by sending a reverse request for channel 1 in the K1 byte. The K2 byte indicates that ADM 22 has bridged channel 1 to the protection line. In row (d), the protection router selects (i.e., receives) channel 1 data from the protection line based on the received K2 byte, and indicates that channel 1 is bridged to the protection line via K2. Lastly in row (e), ADM 22 selects (i.e., receives) channel 1 data from the protection line based upon the received K2 byte.

Once the APS line switch indicated in Table 1 has completed, the protection router sends a message to the working router over side-band connection 24 indicating that the line switch has been performed. The working router then responds by taking down the SONET interface module and initiating a routing topology update. Similarly, the protection router brings its SONET interface module up, and advertises availability of routes accessible via its SONET interface module. Thus, although the switch to the protection line is performed by K1 and K2 bytes carried on the protection line, the line switch is actually initiated by the working router.

Switching Scenario 2

In the second switching scenario, the working line is again assumed to be active, however, the switch to the protection line is initiated by the protection router rather than the working router. In one embodiment, the protection router initiates the line switch based at least in part upon the protection router losing contact with the working router. In one embodiment, the protection router periodically transmits heartbeat messages to the working router over side-band connection 24 (shown in FIG. 2). In one embodiment, side-band connection 24 represents an Ethernet-based connection between the working and protection routers. If the protection router detects that a loss of contact with the working router has occurred, for example, by not receiving a response to the transmitted heartbeat messages, the protection router, without additional information, will not be able to discern whether the communication lapse is due to a failure with the working router, or due to a failure of the side-band (e.g., Ethernet) connection, for example. In such an event, according to one embodiment of the invention, an identifier value is included within a PPP configuration frame sent from the protection router, via the ADM and SONET ring, in order to notify the working router that a line switch has occurred. In one embodiment of the invention, the protection router initiates the line switch by invoking the APS protocol as is illustrated above in Table 1 with respect to switching scenario 1. After the switch has been performed, the protection router brings its SONET interface module up and advertises its availability via one or more routing protocols known in the art.

As part of bringing its SONET interface module up, the protection router initializes a PPP link between the protection router and the neighboring router on the SONET ring. In addition to specifying the encapsulation method, PPP also specifies the Link Control Protocol (LCP) which is described more fully in RFC1661. According to RFC1661, if the PPP protocol field (shown in FIG. 5) contains "c021 h", exactly one LCP packet will be encapsulated within the PPP information field. All LCP-compliant packets include an 8-bit code field that identifies the LCP packet type, and an 8-bit identifier field that is used as an aid in matching LCP requests and replies. In one embodiment of the invention, the identifier field of the LCP packet is used to notify the working router that a line switch has occurred. This notification necessarily occurs via the ADM and SONET ring. Advantageously, the neighboring router, a peer in the PPP link with the protection router, requires no modification for the described embodiment to operate.

Figure 7:
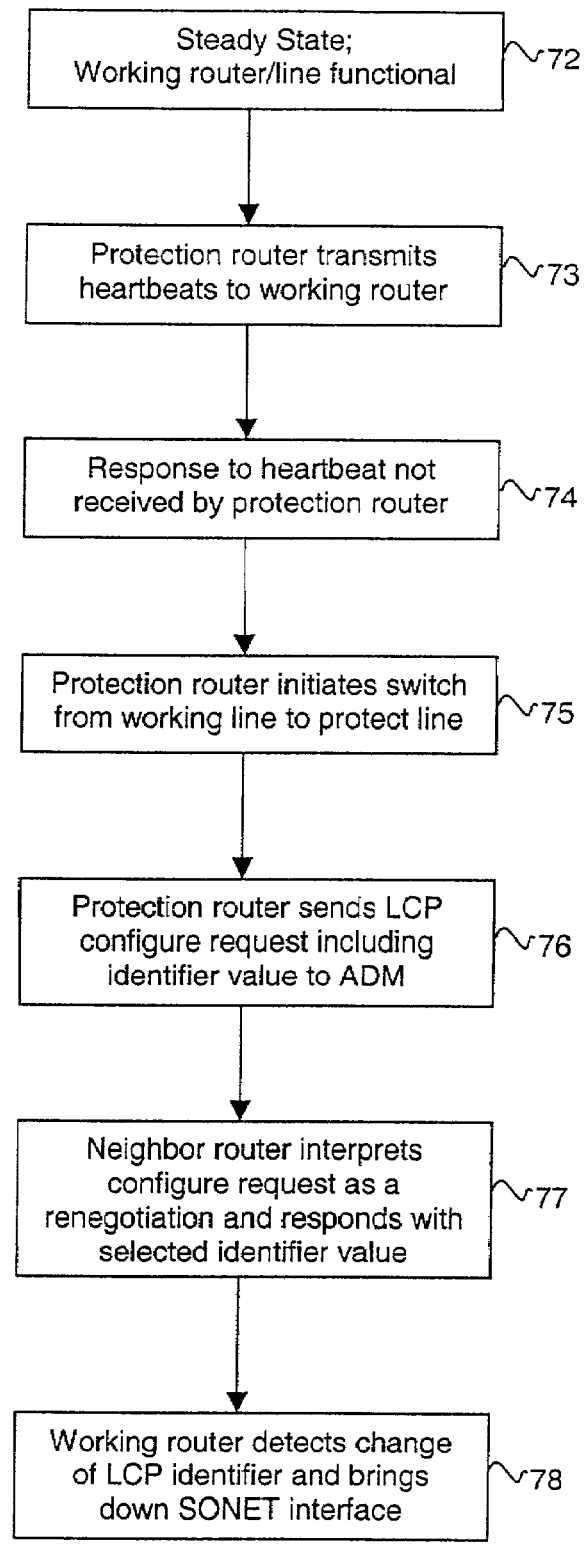
FIG. 7 is a flow diagram illustrating the protection router initiated switching according to one embodiment of the invention.

FIG. 7 is a flow diagram illustrating one embodiment of the protection router initiated switching operation described above. Both the working line and the working router are assumed to be up and active and operating in a steady state where no requests are being made (72). According to the SONET APS standard, K1 and K2 overhead bytes are transmitted on the protect line, and payload data is transmitted on the working line. Because the working router may not receive the content of the K1 and K2 bytes, the working router is not aware of which switch line is active.

Periodically, the protection router transmits heartbeat messages to the working router over the previously described side-band connection (73). Under normal operating conditions, the working router would respond to the heartbeat messages within a predetermined amount of time. Therefore, if a response to one or more of the heartbeat messages is not received by the protection router within the allotted amount of time, the protection router infers that a communication problem exists (74). Because the problem may be caused by failure of the working router or by failure of the side-band connection, the protection router initiates a switch from the working line to the protection line (75), and sends an LCP configure request via the ADM (76) to the peer PPP router, that is, the neighboring router on the SONET ring. According to one embodiment of the invention, the protection router includes within the LCP, a predetermined identifier value that identifies the originator of the request. In one embodiment of the invention, the most significant bit of the LCP identifier field is used to indicate the originator of the LCP request. For example, a "0" in the most significant bit location of the LCP identifier field signifies that the LCP request was originated by the working router, and a "1" in the most significant bit location of the LCP identifier field signifies that the LCP request was originated by the protection router.

Once the protection router transmits the LCP configure request including the identifier value via the ADM (76), the request is received by a neighboring SONET device, such as a router. Because the neighbor device, for example, believes it is communicating with a single "virtual" router rather than two separate routers, the neighbor device interprets the configure request as a renegotiation and responds to the request with an LCP configure response (e.g., a configure-ack datagram) including the identifier selected by the originator (i.e., protection router) (77). The response is transmitted over the SONET ring to the ADM. Because LCP packets received at the ADM are then transmitted from the ADM over both the working and the protect lines, the working router will receive from the ADM the same response that was sent to the protection router (78). Thus, by examining the identifier field, and recognizing the identifier value as that assigned to the protection router, the working router is able to determine that the protection router is in control of the PPP link (79). For example, according to one embodiment of the invention, whenever the working router receives an LCP packet that contains an identifier field value having the most significant bit set to "1", the working router recognizes that the protection router is in control of the PPP link. Thereafter, the working router disables its SONET interface so as to not advertise inaccurate routing information.

Additionally, the working router may periodically transmit configure request datagrams containing an identifier value with the most significant bit set to "0", in order to detect a condition where the protection router has failed and the ADM has performed a line switch back to the working line. By inspecting each configure response received on the working line, the working router is able to recognize this condition when the most significant bit of a received identifier value is set to "0". Upon recognizing this condition, the working router will activate its SONET interface.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. In a network having a router coupled to a multiplexor via a first multiplexor line and a redundant router coupled to the multiplexor via a second multiplexor line, the multiplexor further coupled to a network ring, a method comprising:

transmitting by the redundant router a signal to the router through a communications medium coupling the router and the redundant router;

initiating by the redundant router a switch from the router communicating with the multiplexor via the first multiplexor line to the redundant router communicating with the multiplexor via the second multiplexor line based at least in part on the redundant router not receiving a response via the communications medium to the signal; and transmitting by the redundant router a request signal to a neighbor device coupled to the network ring, the request signal transmitted via the second multiplexor line, the multiplexor and the network ring, the request signal indicating an identifier of the redundant router;

transmitting by the neighbor device a response signal to the redundant router via the network ring and multiplexor, the response signal indicating the identifier of the redundant router;

transmitting by the multiplexor the response signal to the router via the first multiplexor line and the redundant router via the second multiplexor line;

receiving at the router via the first multiplexor line the response signal and detecting a switch to communication with the multiplexor from the router via the first multiplexor line to the redundant router via the second multiplexor line based on the presence of the identifier of the redundant router in the response signal.

2. The method of claim 1, wherein transmitting by the redundant router the request signal to the neighbor device further comprises establishing a point-to-point link between the redundant router and the neighbor device.

3. The method of claim 1, wherein the ring network comprises a SONET-based ring network.

4. The method of claim 3, wherein the multiplexor comprises an add-drop multiplexor coupled to the SONET-based ring network.

5. The method of claim 3, wherein the communications medium comprises a local area network that operates out-of-band with respect to the SONET network.

6. The method of claim 2, wherein the redundant router utilizes a link control protocol (LCP) to establish the point-to-point link between the redundant router and the neighbor device.

7. The method of claim 6, wherein the identifier is provided in an identifier field of a LCP-based datagram.

8. The method of claim 7, wherein the most significant bit of the identifier field in the LCP-based datagram is utilized to indicate a line switch to the redundant router.

9. The method of claim 1, wherein the neighbor device comprises a router.

10. The method of claim 1, further comprising terminating communication between the router and multiplexor based at least in part on the router receiving the response signal.

11. A method comprising:

transmitting a first signal from a protection router to a working router via a side band connection;

if the protection router fails to receive a response to the first signal from the working router, then:

transmitting a second signal from the protection router to a neighbor device via a signal multiplexor to which the protection router is coupled by way of a protection line and the network device is coupled by way of a network ring, the second signal providing an indicator for the protection router;

transmitting a third signal from the neighbor device in response to the second signal, the third signal providing the indicator for the protection router;

receiving the third signal via the network ring at the signal multiplexor and forwarding the third signal to the protection router via the protection line and to the working router via a working line;

receiving the third signal at the working router and terminating communication between the working router and the signal multiplexor on detecting the indicator for the protection router in the third signal.

12. The method of claim 11, wherein transmitting a second signal from the protection router to a neighbor device comprises transmitting a configuration request signal.

13. The method of claim 12, wherein transmitting a configuration request signal from the protection router to a neighbor device comprises transmitting a link control protocol configuration request signal.

14. The method of claim 13, wherein the indicator for the protection router comprises a link control protocol identifier of the protection router.

15. The method of claim 14, wherein transmitting a third signal from the neighbor device in response to the second signal, the third signal providing the indicator for the protection router, comprises transmitting a configuration response signal from the neighbor device in response to a link control protocol configuration request signal.

16. The method of claim 15, wherein transmitting a configuration response signal from the neighbor device in response to a link control protocol configuration request signal comprises transmitting a link control protocol configuration response signal from the neighboring device in response to a link control protocol configuration request signal.

17. The method of claim 16, wherein the third signal providing the indicator for the protection router comprises a link control protocol configuration response signal providing the link control protocol identifier of the protection router obtained from the link control protocol configuration request signal.

18. The method of claim 17, wherein receiving the third signal via the network ring at the signal multiplexor and forwarding the third signal to the protection router via the protection line and to the working router via a working line comprises receiving the link control protocol configuration response signal via the network ring at the signal multiplexor and forwarding it to the protection router via the protection line and to the working router via the working line.

19. The method of claim 18, wherein receiving the third signal at the working router and terminating communication between the working router and the signal multiplexor on detecting the indicator for the protection router in the third signal, comprises receiving the link control protocol configuration response signal at the working router and terminating communication between the working router and the signal multiplexor on detecting the link control protocol identifier of the protection router in the configuration response signal.

20. A method comprising:
    transmitting a heartbeat signal from a protection router for receipt by a working router;
    if the protection router fails to receive a signal in response to transmitting the heartbeat signal, then:
        transmitting a request signal from the protection router for receipt by a neighbor device via a signal multiplexor and a network ring, the request signal providing an indicator for the protection router, the request signal for causing:
            the neighbor device to transmit a response signal from the neighbor device in response to the request signal, the response signal to provide the indicator for the protection router;
            the signal multiplexor to receive the response signal via the network ring and forward the response signal to the protection router via the protection line and to the working router via a working line;
            the working router to receive the response signal and terminate communication between the working router and the signal multiplexor if the indicator for the protection router in the response signal is detected.

21. An article of manufacture, comprising:
    a machine accessible medium that provides instructions that when executed by the machine cause the machine to:
        transmit a heartbeat signal for receipt by a working router;
        if the machine fails to receive a signal in response to the heartbeat signal, then:
            transmit a request signal from the protection router for receipt by a neighbor device via a signal multiplexor and a network ring, the request signal providing an indicator for the protection router, the request signal for causing:
                the neighbor device to transmit a response signal from the neighbor device in response to the request signal, the response signal to provide the indicator for the protection router;
                the signal multiplexor to receive the response signal via the network ring and forward the response signal to the protection router via the protection line and to the working router via a working line;
            the working router to receive the response signal and terminate communication between the working router and the signal multiplexor if the indicator for the protection router in the response signal is detected.

* * * * *